United States Patent [19]

Nasse

[11] Patent Number: 4,582,603
[45] Date of Patent: Apr. 15, 1986

[54] APPARATUS FOR THE MECHANICAL CLEANING OF A COLD-WATER STREAM

[75] Inventor: Johannes Nasse, Hattingen-Niederweniger, Fed. Rep. of Germany

[73] Assignee: Taprogge Gesellschaft mbH, Wetter, Fed. Rep. of Germany

[21] Appl. No.: 685,073

[22] Filed: Dec. 24, 1984

[30] Foreign Application Priority Data

Dec. 24, 1983 [DE] Fed. Rep. of Germany ....... 3347064

[51] Int. Cl.[4] .................... B01D 29/26; B01D 29/38
[52] U.S. Cl. .................. 210/323.2; 210/333.1; 210/413; 210/445; 210/446
[58] Field of Search .......... 210/323.2, 333.1, 413–415, 210/445, 446, 449

[56] References Cited

U.S. PATENT DOCUMENTS

| 525,182 | 8/1894 | Blumer | 210/445 X |
|---|---|---|---|
| 1,585,817 | 5/1926 | Bailey et al. | 210/445 X |
| 1,615,609 | 1/1927 | Bailey et al. | 210/445 X |
| 1,977,601 | 10/1934 | Winton | 210/415 X |
| 2,066,479 | 1/1937 | MacIsaac | 210/414 X |
| 2,275,958 | 3/1942 | Hagel | 210/414 X |
| 2,310,587 | 2/1943 | MacNeill | 210/445 X |
| 2,545,789 | 3/1951 | Miller | 210/445 X |
| 2,834,474 | 5/1958 | Jalkanen | 210/413 X |
| 3,380,591 | 4/1968 | Muller | 210/333.1 X |
| 3,836,464 | 9/1974 | Brookins et al. | 210/413 |

FOREIGN PATENT DOCUMENTS

| 261635 | 5/1968 | Austria | 210/333.1 |
|---|---|---|---|
| 262327 | 6/1968 | Austria | 210/413 |
| 3144796 | 5/1983 | Fed. Rep. of Germany | 210/446 |
| 698636 | 11/1979 | U.S.S.R. | 210/446 |
| 762929 | 9/1980 | U.S.S.R. | 210/446 |

Primary Examiner—Robert Spitzer
Attorney, Agent, or Firm—Karl F. Ross; Herbert Dubno

[57] ABSTRACT

A screening apparatus for solids in a power plant condenser water line has a head orbiting the filter element which spans the outlet end of the pipe section forming the housing for the unit and flanged in this pipeline. A motor is mounted on the pipe section and is connected by a right-angle drive to cause orbiting of the head and the suction pipe is connected by an elbow to the axial hollow shaft of the head.

9 Claims, 6 Drawing Figures

APPARATUS FOR THE MECHANICAL CLEANING OF A COLD-WATER STREAM

FIELD OF THE INVENTION

My present invention relates to the mechanical cleaning of a cold-water stream to remove particulates or other solid elements entrained in a cold-water stream, especially for the cold-water line of a power plant condenser.

More particularly, the invention relates to a screening device of the type in which the collected material from the screen is removed at least in part by a backwashing action.

BACKGROUND OF THE INVENTION

It is known to provide, upstream along a cold-water line of an electrical power plant condenser, a screening device or apparatus which is utilized for the mechanical removal of solids from the water stream. The device can comprise a cylindrical housing which is formed with a screen surface through which the cooling water passes so that solids can collect upon this surface. A rotating suction device is juxtaposed with the screen surface and can draw the contaminants therethrough for a partial backwashing of the screen surface.

The rotating suction device is thus connected to a mechanical drive for effecting the continuous or intermittent rotation. The mechanical cleaning of a water stream with such a device has been associated with a thermodynamic problem which can be manifested as an entropy reduction. For cleaning of the screen in this manner, cleaning work must be done and invariably results in a pressure loss. The device just described has been characterized as a differential pressure screen apparatus and because of pressure losses associated with the cleaning operation, efficiency is comparatively poor.

One such device is described in Bulletin IK 1982 of the Atlantik Geratebau GmbH of the German Federal Republic and utilizes a vessel to form the housing and designed in accordance with pressurized container techniques. The static pressure of the cooling water must, however, be high for this system to be useful. In this system, the cooling water inflow is effected radially via a fitting on the container shell and the outflow of the cooling water beyond the screen is likewise radial via a fitting connected to the housing shell.

The cooling water flow to the container thus has an S-pattern. The fittings required are associated with static problems with respect to strength and stability, create assembly problems and result in a high capital cost for the unit.

The screening element of the container is generally mounted between two portions of the container shell in the form of screening cylinders or cartridges, (e.g. so-called filter candles).

The rotating suction device is provided with an axially extending suction duct which simultaneously forms the shaft on which the rotating unit can be orbited and the shaft extends axially out of an axial end of the housing where it is coupled to the transmission or speed reducing gearing of an electric motor. Service openings are provided in the container cover or covers and are closed by corresponding plates.

The arrangement whereby the shaft and the suction duct extend axially through the container and the inlet and outlet for the main water stream communicate radially therewith has been found to give rise to such considerable pressure losses as to make the utility of the apparatus questionable in many cases.

OBJECTS OF THE INVENTION

It is, therefore, the principal object of the present invention to provide an improved apparatus for mechanically moving solids from a water stream, particularly a cooling water stream communicating with a condenser of an electric power generating plant, whereby the disadvantages enumerated above are obviated.

Another object of this invention is to provide an improved water-cleaning screening apparatus with reduced pressure drop and lower capital and operating cost.

Still another object of our invention is to provide an improved screening apparatus which more efficiently can remove contaminants from a water stream than earlier cleaning units.

It is also an object of this invention to eliminate the need for an expensive pressure vessel and yet be able to carry out effective water screening using the differential pressure screening principles but with reduced pressure losses and, consequently, much greater operating efficiency.

SUMMARY OF THE INVENTION

These objects and others which will become apparent hereinafter are attained, in accordance with the present invention, by replacing the expensive pressure vessel of the earlier differential pressure screening apparatus with a cylindrical tube section, preferably connected by flanges to adjoining duct sections of the cooling water line connected to a power plant condenser, providing the sieve or screening element as a sieve surface spanning the cross section of this pipe line and hence the pipe section and thus corresponding to the cross section thereof, and by providing the suction head on a rotating axial member mounted in this pipe section and connected by a drive to a motor mounted externally of this pipe section which also is formed with a radial fitting for the suction duct joined by an elbow to the head which is juxtaposed with the screening surfaces.

The pipe section has axial inlet and outlet ends which correspond to the full cross section of the pipe section in planes perpendicular to the axis thereof and communicate with the opposite sides of the pipe lines in which the pipe section is provided.

This affords a simple construction of the rotating mechanism which can include a radial shaft and, within the pipe section, a transmission converting rotation of the radial shaft to rotation of the axial shaft of the hood about its axis. The drive motor can be provided in a tube fitting which is disposed within or is constituted by the suction fitting or is provided in or adjacent the suction line. Alternatively, the suction fitting can lie diametrically opposite the motor which can be mounted on the exterior of the pipe section. The transmission may include a bevel gear forming a ring gear mounted on the wholly axial shaft of the suction head and meshing with a bevel pinion connected to the radial shaft of the motor.

By providing the support for the mechanism described in the form of a simple pipe section which can have a minimum length in its axial direction, i.e. the direction of flow, at least in part because the sieve element can extend into an adjoining portion of the pipe line in which the pipe section is flanged, the combination of the flanges and the minimum length pipe section can form a statically rigid and high strength pressure containing ring, with even greater structural integrity than a larger pressure vessel.

One of these flanges can be used as part of the fastening means for the sieve element, i.e. the flange of the sieve element can be fixed between this pipe section flange and the adjoining flange of the pipeline. In this arrangement the pipeline itself becomes part of the housing for the sieve element and added length for the sieve element is not required, the pipe section forming only the mounting for the suction device.

According to the invention, moreover, the sieve element may be provided with a plurality of sieve baskets or screens which can be cylindrical or individually axially symmetrical and can be disposed in an angularly equispaced relationship about the axis of the pipe section, e.g. as so-called candle filters or screens. Alternatively, the sieve element can be a screen cone which can extend significantly into the adjoining pipeline section. It is also possible, in accordance with the invention, to provide the sieve element as a corrugated sieve plate preferably with annular corrugations and which spans the end of the pipe section opposite its inlet.

The configuration of the suction head itself likewise can be kept comparatively simple in accordance with the principles of the invention. In general the suction head can be formed as a suction funnel and can have its inlet conform to the screen surface or the screen units of the inlet. For example, in the case of a corrugated plate, the inlet can extend radially, while in the case of a sieve cone, the inlet of the head might lie along the generatrix of a conical orbit for the head. When candle filters or the like are provided, a circular inlet can be provided which periodically and in turn registers with each of the candle filters.

The invention provides an important advantage in that the pipe section can be connected in or form part of the pipeline. In the preferred and best mode embodiment of the invention, the pipe section has a diameter corresponding to the diameter of the pipeline.

It is possible, in accordance with the invention, however, to utilize the diameter of this pipe section to control the flow of velocity, e.g. by constricting the pipe section relative to the remainder of the pipeline to increase the flow velocity in the region of the screening element, or by enlarging the diameter of the pipe section over the diameter of the pipeline to reduce the velocity.

The invention eliminates the need for special pressurized vessels and complex flow paths for the main water stream as in the prior art, integrating the sieve unit directly with the cooling-water flow and exploiting the pipeline for this flow as part of the housing for the screen element.

As a consequence the structure is greatly simplified, pressure losses are reduced or eliminated and the entire screening process is made more efficient.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
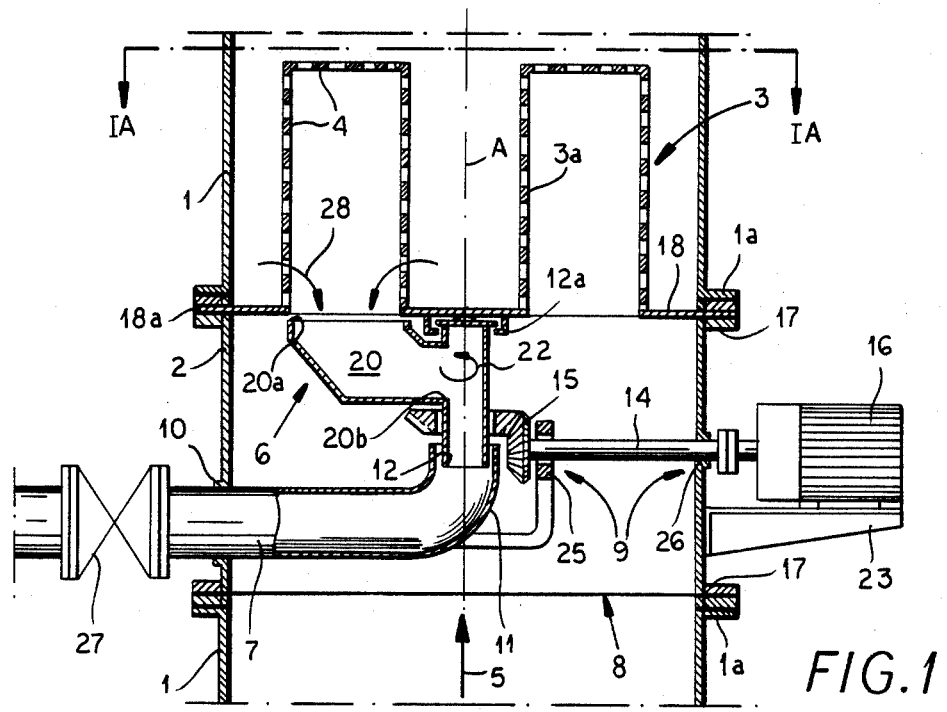
FIG. 1 is an axial section, somewhat diagrammatic in form, illustrating one embodiment of a screening apparatus of a power plant condenser in accordance with this invention.
Figure 1A:
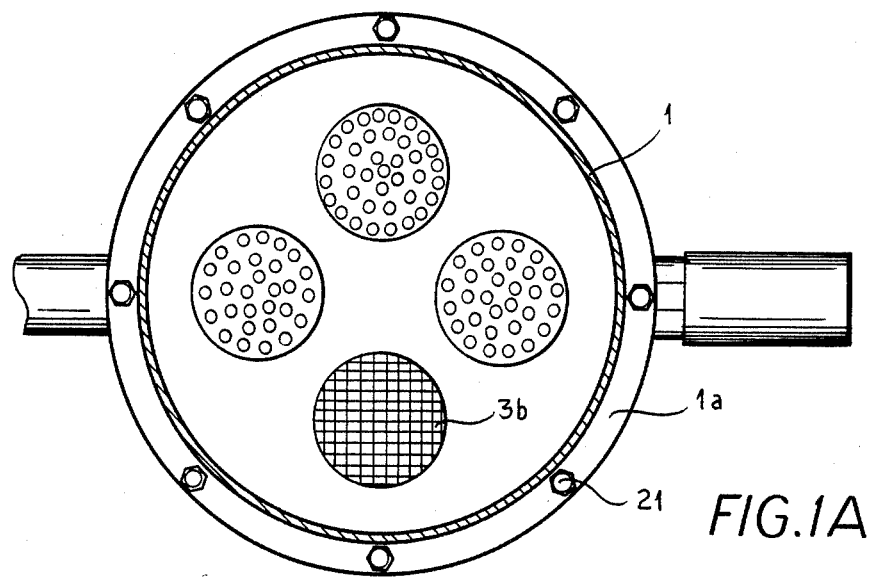
FIG. 1A is a section taken along the line IA—IA of FIG. 1.

Referring initially to FIGS. 1 and 1A it will be seen that a pipeline consisting of the pipes 1 and their respective flanges 1a interrupted by a pipe section 2 of a screening apparatus according to this invention which comprises a screen element represented generally at 3 and comprising a plate 18 spanning the cross section of the pipeline and having a flange portion 18a sandwiched between the flange 17 of the section 2 and the flange 1a of the downstream pipe 1.

As can be seen in FIG. 1A, bolts 21 are provided to connect the flanges together, similar bolt connections being provided wherever flange connections are required. The filter element comprises a plurality of cylindrical perforated sheet filter members, here referred to as filter candles and represented at 3a, the perforations thereof being shown at 4. As can be seen from FIG. 1A, some of these filter members may also be elements composed of screen material as represented at 3b and can also be termed baskets. The total flow cross section of the perforations should equal the flow cross section of the pipeline and pipe section 2.

Note that the filter element extends largely into the adjacent pipe 1 and is fixed in place by the flange connection which joins the pipe section 2 at its outlet end to the remainder of the pipeline.

The pipe section 2 is also formed with a suction device which has been represented at 6. This suction device 6 comprises a suction head 20 which is funnel-shaped in that it converges away from its mouth 20a which may be circular to conform to the circular outlets of the filter candles 3a and which, upon rotation of the head 20, is aligned in succession with these filter candles.

The head 20 empties at 20b into an axial hollow shaft 12 which is rotatably mounted on a bearing assembly 12a on the underside of the plate 18 so that, upon rotation of the shaft 12, the head 20 orbits about the axis A so represented by the arrow 22. To this end, the hollow shaft 12 carries a ring gear 13 which is also a bevel gear meshing with a bevel pinion 15, the gears 13, 15 forming a right angle transmission between a shaft 14 which extends radially and is driven by a motor 16 mounted on a bracket 23 on the pipe section 2.

The assembly 13 and 16 forms the mechanical drive 9 for rotating the suction device.

The suction pipe 7 which communicates with the hollow shaft 12 is formed with an elbow 11 and thus extends radially from the pipe section being rigidly secured thereto at 10. Bearings 25 and 26 directly or indirectly mounted on the pipe section 2 rotatably support the shaft 14. A suction pump (not shown) is connected by valve 27 to the suction line 7. The pipe 7 passes through an opening in the wall of the pipe section 2.

At the inlet side 8 which in the embodiment shown extends the full cross section of the pipe 1, flanges 1a and 17 serve to connect the pipe section in the pipeline.

In the embodiment thus far described, as in the other embodiments as well, the sieve element 3, in order to reduce the pressure loss, has a cross section area at least equal to that of the pipeline and is disposed at or forms the outlet for the apparatus. The filter element 3 extends significantly into the adjoining pipeline portion to allow the pipe section to be of minimum length.

In operation, as water flows through the pipeline in the direction of the arrow 5, the solids are filtered or screened therefrom and as the head 20 orbits into communication with different sections of the filter, the suction applied via line 7 draws a portion of the liquid back through filter in the dimension of arrows 28 and thereby reflects a local backwashing.

Figure 3:
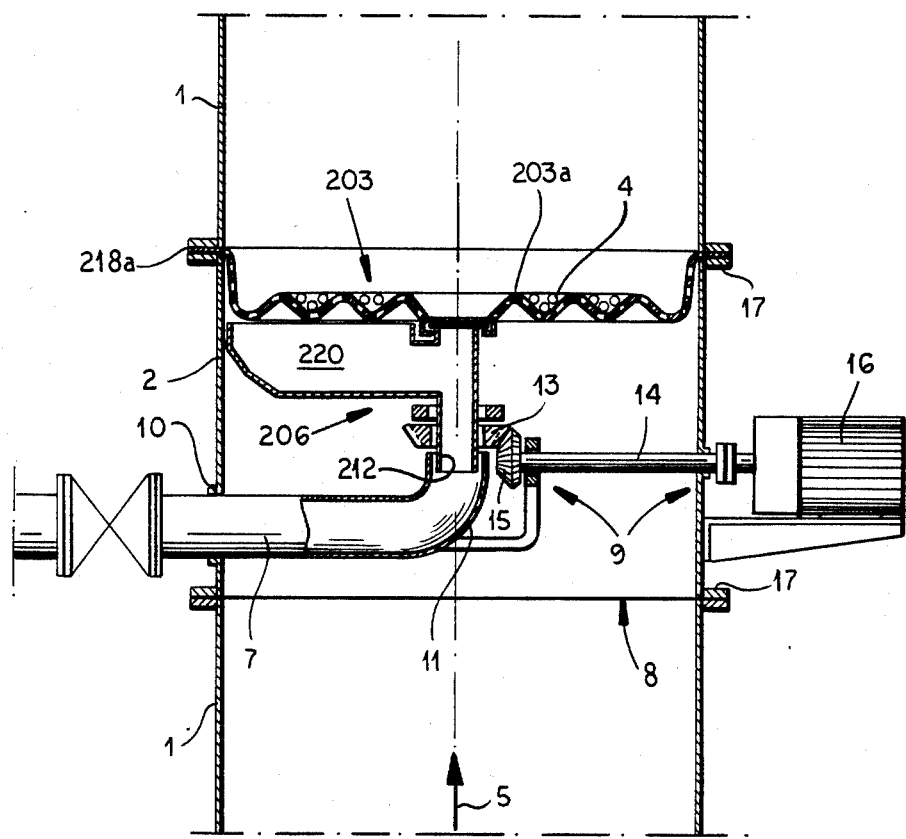
FIG. 3 is yet another axial section of a third embodiment of the invention.

The apparatus shown in FIG. 3 differs from that of FIG. 1 in that the filter element 103 is formed as a conical screen 103a having apertures 104 while the cross sections are equal to that of the pipeline 1. In this embodiment as well, the screen element 103 has a flange 118a which is affixed between the flanges of the pipe section 2 and the adjoining pipeline. In addition a bearing head is provided at 19 for the suction head 120 and represents the apex of the screening element lying well within the downstream portion of the pipeline.

Figure 2:
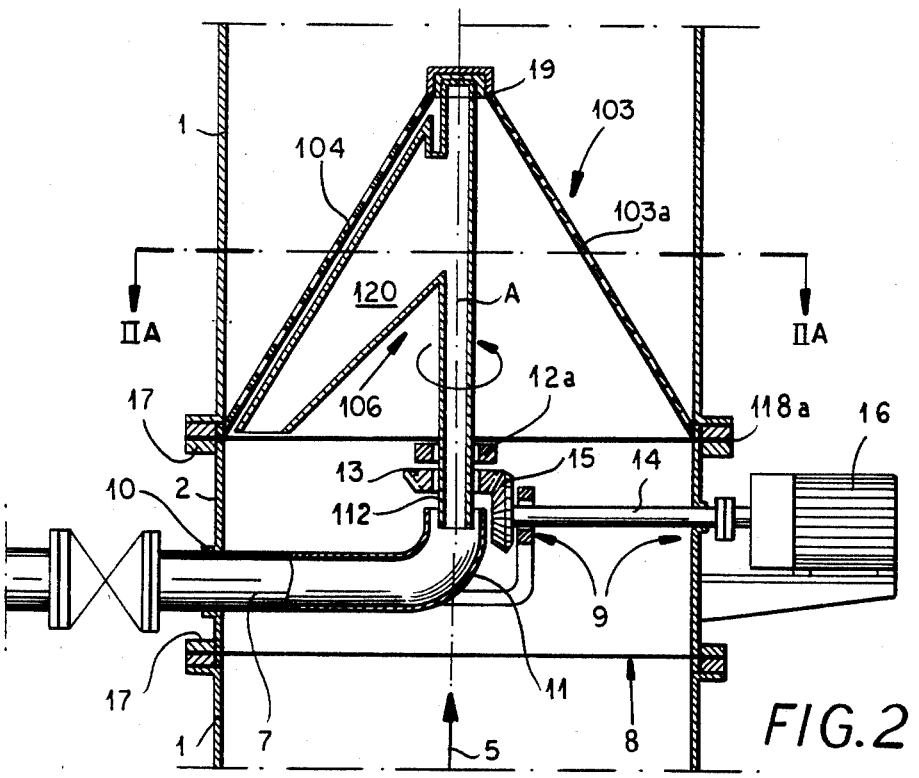
FIG. 2 is an axial section through another embodiment of this invention, likewise highly diagrammatic in form.
Figure 2A:
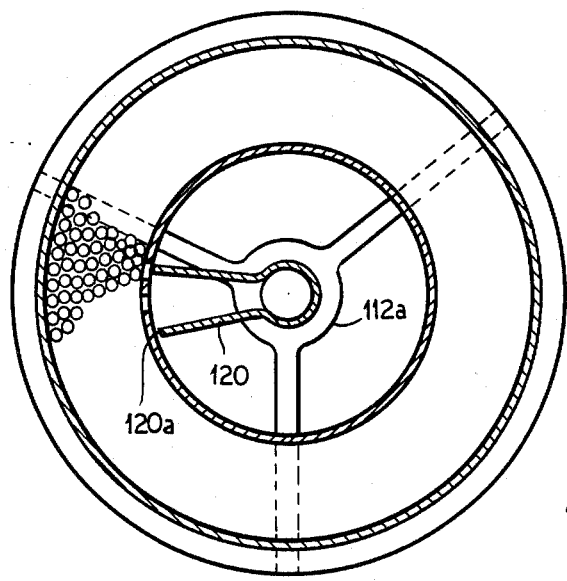
FIG. 2A is a section line along the line IIA—IIA of FIG. 2.

As can be seen from FIGS. 2 and 2A, moreover, the suction device 106 has an elongated hollow shaft 112 which is journaled in the bearing 19 and in a bearing 112a mounted on the pipe section 2. The suction head 120 has a slot-like opening 120a lying generally along the generatrix of the screen and sweeping around the latter as the head is orbited by rotation of the gear 13 connected to the hollow shaft 112 in the manner previously described.

FIG. 3 differs from the embodiments previously described in having a corrugated screen filter 203 whose filter elements are corrugations 203a extending circularly or in annular arrangement, although the filter element 203 is also provided with the flange 218a which allows it to be held between the pipe section 2 and the downstream portion of the pipeline. The suction head 220 here extends radially and the relatively short hollow pipe section 212 of the suction device 206 is driven in the manner previously described.

Figure 4:
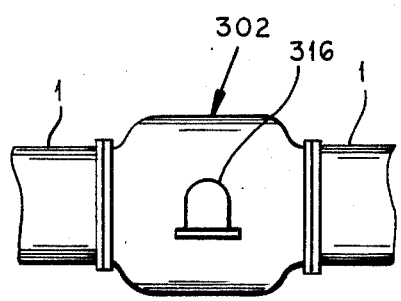
FIG. 4 is an elevational view drawn to a reduced scale and showing still another embodiment of the pipeline section connected in the cooling-water pipeline for a condenser according to the invention.

As can be seen from FIG. 4, all of these specific arrangements of the filter elements and the respective suction head can be provided in a pipe section 302 which can have a larger cross section than that of the adjoining pipes 1 but can be flanged thereto in the usual manner. Only the motor 316, for orbiting the suction head, has been illustrated for this filter.

I claim:

1. An apparatus for removing solids from a water stream in a pipeline, comprising:
    a one-piece pipe connected in said pipeline adjoining and connected to lengths of pipe of said pipeline at opposite ends, and having an inlet end receiving water to be filtered and an outlet end for discharging water from said section at said opposite axial ends of said section;
    an axially projecting filter element extending across said outlet end of said pipe section;
    means along a rim of said outlet end of said pipe section for fastening said filter element between said outlet end of said pipe section and an adjoining one of said pipe lengths with said element projecting axially into said one of said pipe lengths in line with the pipeline;
    a suction device including a head juxtaposed with a limited portion of said filter element and having an axially extending hollow shaft, a radial fitting on said section, and a suction pipe connecting said radial fitting with said hollow shaft and including an elbow, said pipe section forming a one-piece housing for said suction device; and
    a motor mounted on said pipe section and operatively connected with said hollow shaft for orbiting said suction head over successive regions of said filter element, said filter element having a sieve surface corresponding at least to the flow cross section of said pipeline at said outlet end.

2. The apparatus defined in claim 1 wherein said motor includes a ring gear on said hollow shaft and a bevel gear meshing with said ring gear and carried by a radial shaft journaled on said pipe section.

3. The apparatus defined in claim 1 wherein said filter element includes a screen plate spanning said outlet end and provided with a plurality of angularly spaced axially extending filter members.

4. The apparatus defined in claim 1 wherein said filter element is a filter cone.

5. The apparatus defined in claim 1 wherein said head is a suction funnel conforming in shape to the limited region of the filter element with which it is juxtaposed.

6. The apparatus defined in claim 1 wherein said pipe section is formed with flanges on its opposite ends connected to flanges of said pipe lengths.

7. The apparatus defined in claim 1 wherein said pipe section is formed with a flange at its outlet end and said filter element is provided with a marginal portion fixed in a place relative to said pipe section at least in part by said flange.

8. The apparatus defined in claim 1 wherein said pipe section has a diameter corresponding to that of said pipeline.

9. An apparatus for removing solids from a water stream in a pipeline comprising:
    a pipe section connected in said pipeline and having an inlet end receiving water to be filtered and an outlet end for discharging water from said section at opposite axial ends of said section;
    a filter element extending across said outlet end of said pipe section;
    a suction device including a head juxtaposed with a limited portion of said filter element and having an axially extending hollow shaft, a radial fitting on said section, and a suction pipe connecting said radial fitting with said hollow shaft and including an elbow, said pipe section forming a one-piece housing for said suction device; and
    a motor mounted on said pipe section and operatively connected with said hollow shaft for orbiting said suction head over successive regions of said filter element, said filter element having a sieve surface corresponding at least to the flow cross section of said pipeline at said outlet end, said filter element being a corrugated screen plate closing said outlet end.

* * * * *